US007226081B2

(12) United States Patent
Chen

(10) Patent No.: US 7,226,081 B2
(45) Date of Patent: Jun. 5, 2007

(54) STEERING KNUCKLE STRUCTURE

(75) Inventor: Ting-Hsing Chen, Tainan Hsien (TW)

(73) Assignee: Far Great Plastics Industrial Co., Ltd., Tainan Hsien (TW)

( * ) Notice: Subject to any disclaimer, the term of this patent is extended or adjusted under 35 U.S.C. 154(b) by 225 days.

(21) Appl. No.: 11/066,249

(22) Filed: Feb. 28, 2005

(65) Prior Publication Data

US 2006/0192358 A1  Aug. 31, 2006

(51) Int. Cl.
B62D 1/00  (2006.01)
(52) U.S. Cl. .................. 280/771; 280/263; 280/267; 280/87.041
(58) Field of Classification Search ........... 280/771, 280/93.502, 263, 265, 267, 81.5, 86, 86.1, 280/87.01, 87.021, 87.041
See application file for complete search history.

(56) References Cited

U.S. PATENT DOCUMENTS

| 4,617,871 A | * | 10/1986 | Yau | 114/39.24 |
| 5,947,493 A | * | 9/1999 | Pasin et al. | 280/47.34 |
| 6,149,170 A | * | 11/2000 | Dotson | 280/87.021 |
| 6,244,605 B1 | * | 6/2001 | Liu | 280/87.041 |
| 6,808,188 B1 | * | 10/2004 | Fan | 280/87.041 |
| 7,083,177 B1 | * | 8/2006 | Chen | 280/87.041 |
| 2002/0125709 A1 | * | 9/2002 | Wu | 280/771 |
| 2002/0167143 A1 | * | 11/2002 | Shaw | 280/87.041 |

FOREIGN PATENT DOCUMENTS

GB    2048180 A   * 12/1980

* cited by examiner

*Primary Examiner*—Paul N. Dickson
*Assistant Examiner*—Tiffany L. Webb
(74) *Attorney, Agent, or Firm*—Rosenberg, Klein & Lee

(57) ABSTRACT

A steering knuckle structure is incorporated with an upright pipe and a shaft wherein the upright pipe is able to twist. The steering knuckle structure comprises a fastener, a sleeve and a pair of lids. A connector is provided at the bottom of the upright pipe. The sleeve has its two ends covered by the lids. The shaft is pivotally connected to the lids. The sleeve comprises a connecting seat transversely secured at the center portion thereof. The connecting seat comprises a pair of protruding plates at respective ends. Each protruding plate has a hole at the center. The connector is placed in the connecting seat between the two protruding plates. The two holes of the protruding plates are aligned with the connector, and the fastener is inserted into the holes to secure the upright pipe to the sleeve.

2 Claims, 3 Drawing Sheets

STEERING KNUCKLE STRUCTURE

BACKGROUND OF THE INVENTION

1. Field of the Invention

This invention relates to a steering knuckle structure, and more particularly to a steering knuckle incorporated with an upright pipe and a shaft able to twist with respect to each other.

2. Description of Prior Art

The steering structure of a scooter in the market uses a handle to control turns. Some scooters are provided with a double wheel on both front and rear wheels. When making turns, due to the inertial principle, the user will lean towards one side, and the outer wheel will be lifted away from the ground. Thus the user will loss balance and fall to the ground.

SUMMARY OF THE INVENTION

It is the primary objective of the present invention to provide a steering knuckle structure, which provides a steady ride for users to make turns.

It is another objective of the present invention to provide a steering knuckle structure, which is safe to users.

It is a further objective of the present invention to provide a steering knuckle structure, which is easy to maintain.

DETAILED DESCRIPTION OF THE PREFERRED EMBODIMENT

Figure 1:
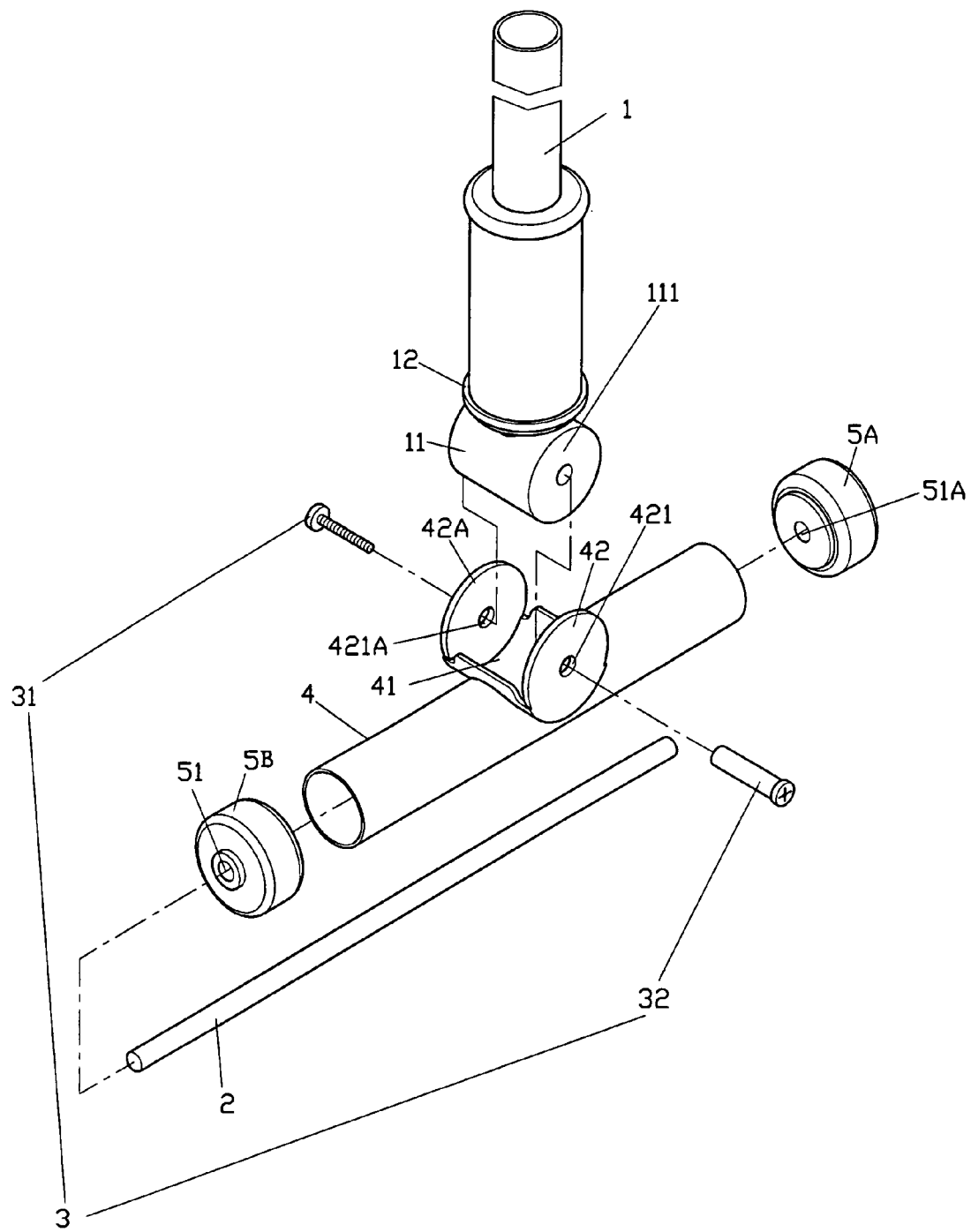
FIG. 1 is an exploded view of the present invention.
Figure 2:
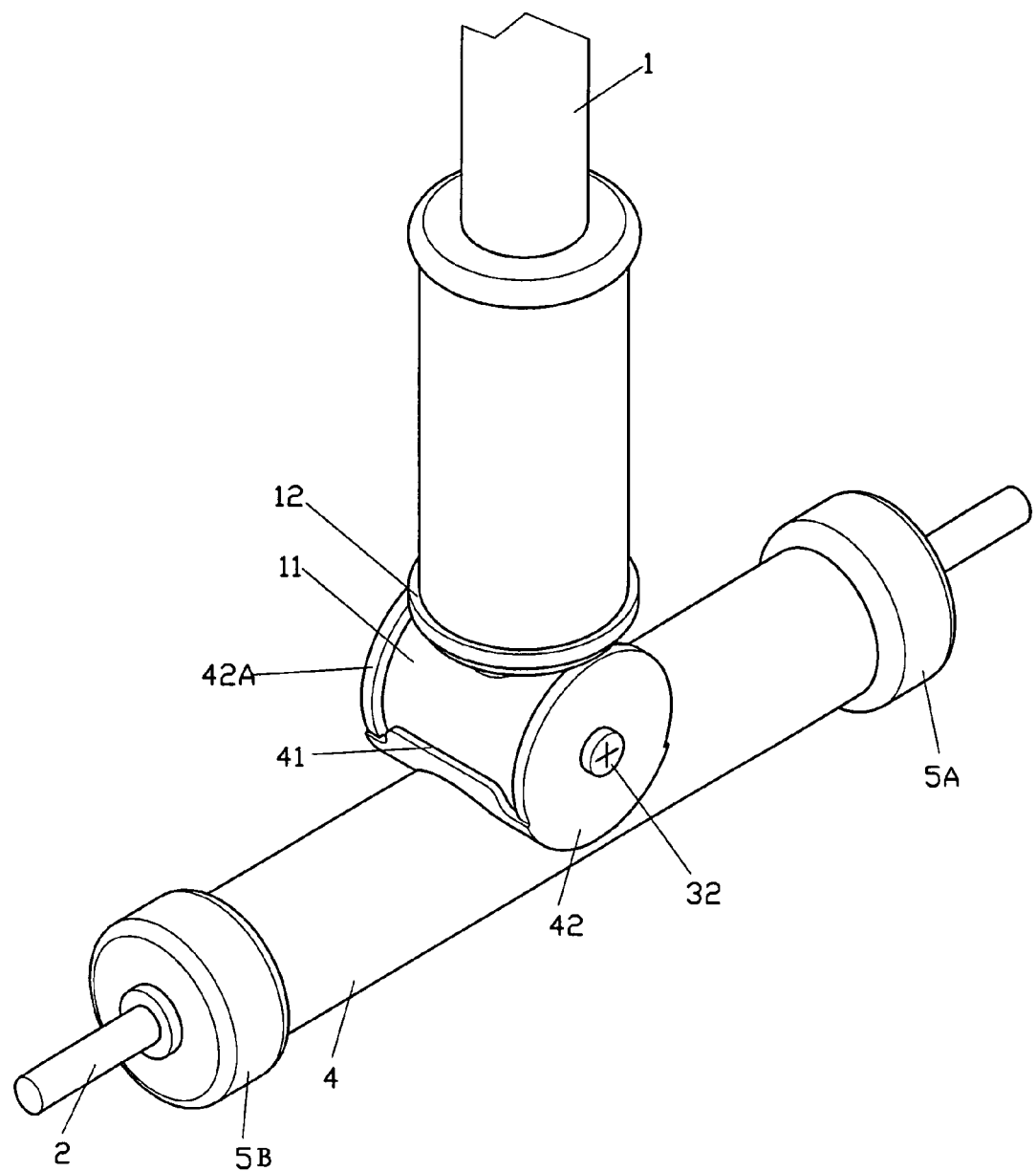
FIG. 2 is a perspective view of the present invention.

As shown in FIGS. 1 and 2, the present invention is incorporated with an upright pipe 1 and a shaft 2, wherein the upright pipe 1 is able to twist. The present invention comprises a fastener 3, a sleeve 4 and a pair of lids 5A and 5B.

The bottom end of the upright pipe 1 is provided with a connector 11 having a blocking ring 12 on the top thereof. The lids 5A and 5B are secured to two sides of the sleeve 4. Both The lids 5A and 5B comprise holes 51 and 51A at the center to receive the shaft 2 therein. The sleeve 4 comprises a connecting seat 41 transversely secured at the center portion thereon. The connecting seat 41 has a pair of protruding pates 42 and 42A at respective ends. Both the protruding plates 42 and 42A comprise holes 421 and 421A. When the connector 11 of the upright pipe 1 is placed in the connecting seat 41 of the sleeve 4 between the two protruding plates 42 and 42A, the holes 421 and 421A are aligned with the connector 11 and secured by the fastener 3 which is composed of a bolt 31 and a nut 32, thus the upright pipe 1 is secured to the sleeve 4.

Figure 3:
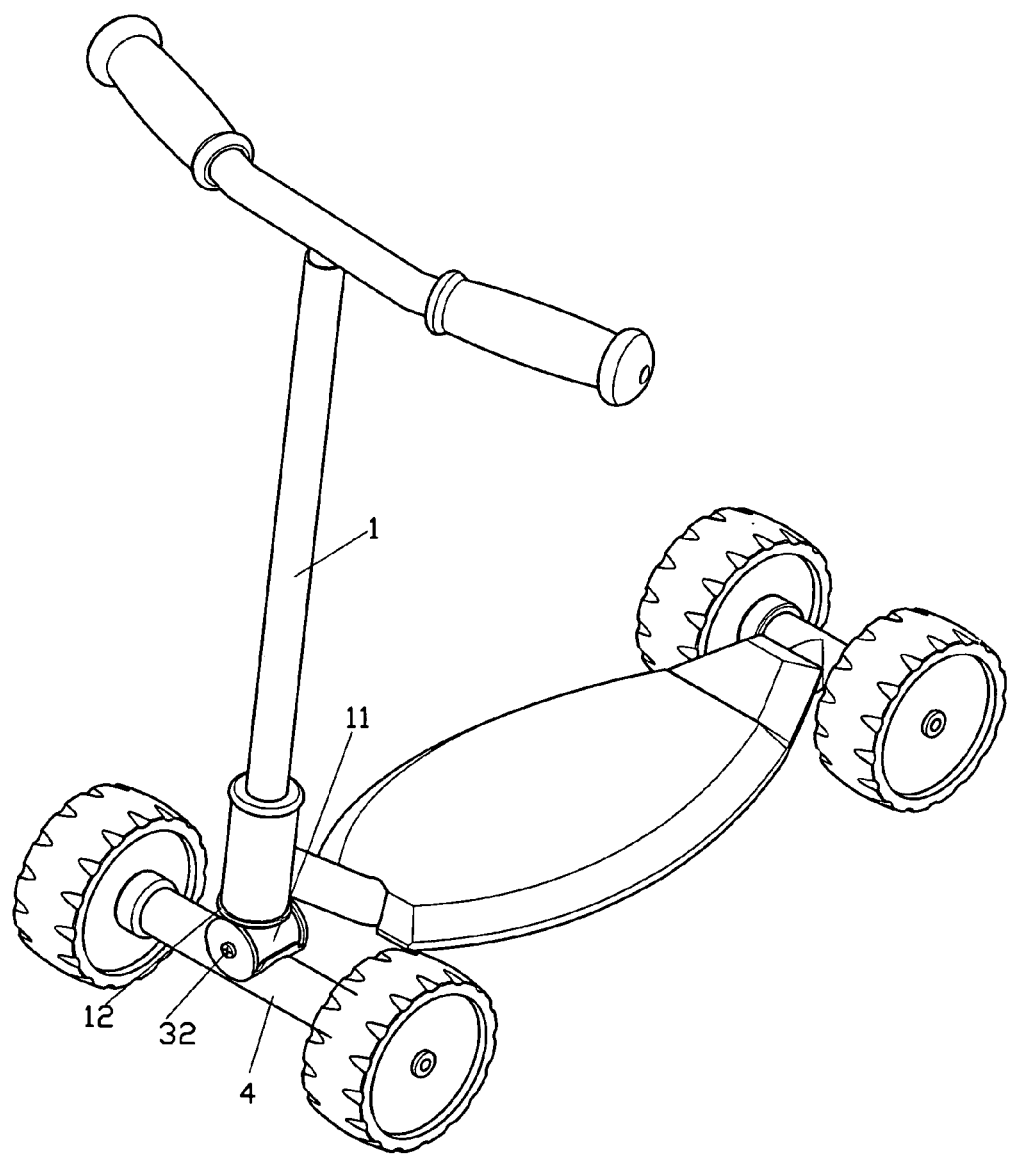
FIG. 3 is a perspective view of the present invention applied to a scooter.

As shown in FIG. 3, the present invention is applied to a scooter. The bottom end of the upright pipe 1 is secured to the sleeve 4 by the fastener 3 wherein the shaft 2 in the sleeve 4 is pivotally connected with front wheels. The upright pipe 1 links the shaft 2 to turn simultaneously to the same direction, while the protruding plates 42 and 42A of the connecting seat 41 confine the turning angle of the connector 11 of the upright pipe 1. When the shaft 2 is turned with respect to the upright pipe 1 in an inclining direction, the two front wheels remain in contact with the ground all the time.

Furthermore, this invention keeps two rear wheels in contact with the ground all the way.

What is claimed is:

1. A steering knuckle structure being incorporated with an upright pipe and a shaft wherein said upright pipe is able to twist, and characterized in that:

said steering knuckle structure comprising a fastener, a sleeve and a pair of lids, said upright pipe comprising a connector at a bottom end, said sleeve being covered by said lids at respective ends, said shaft being pivotally connected to said lids, said sleeve comprising a connecting seat transversely secured at a center portion thereon, said connecting seat comprising a pair of protruding plates at respective ends, each protruding plate comprising a hole at the center thereof, said connector of said upright pipe being placed in said connecting seat between said protruding plates, said connector being aligned with said holes of said protruding plates for insertion of said fastener to secure said upright pipe to said sleeve.

2. The steering knuckle structure of claim 1, wherein said fastener comprises a bolt and a nut, said bolt being inserted through said holes of said protruding plates and said connector to couple with said nut.

* * * * *